(12) United States Patent
Dorfner et al.

(10) Patent No.: US 8,536,285 B2
(45) Date of Patent: *Sep. 17, 2013

(54) SEMI-CONTINUOUS METHOD FOR PRODUCING COPOLYMERS

(75) Inventors: Reinhard Dorfner, Kirchweidach (DE); Klaus Lorenz, Zangberg (DE); Petra Wagner, Trostberg (DE); Christian Scholz, Wald an der Alz (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/133,026

(22) PCT Filed: Nov. 25, 2009

(86) PCT No.: PCT/EP2009/065790
§ 371 (c)(1), (2), (4) Date: Oct. 14, 2011

(87) PCT Pub. No.: WO2010/066577
PCT Pub. Date: Jun. 17, 2010

(65) Prior Publication Data
US 2012/0035300 A1    Feb. 9, 2012

(30) Foreign Application Priority Data

Dec. 8, 2008   (EP) .................................... 08170979

(51) Int. Cl.
C08F 216/14   (2006.01)
C08F 2/10     (2006.01)
C08F 224/00   (2006.01)
C04B 16/04    (2006.01)

(52) U.S. Cl.
USPC .................. 526/67; 524/4; 524/5; 526/317.1; 526/60; 526/271

(58) Field of Classification Search
USPC .................. 526/317.1, 60, 271, 67; 524/5, 4
See application file for complete search history.

(56) References Cited

U.S. PATENT DOCUMENTS 7,125,944 B2   10/2006   Yamashita et al.
2003/0162879 A1   8/2003   Laubender et al.
(Continued)

FOREIGN PATENT DOCUMENTS

WO   WO 2005/075529 A2   8/2005

OTHER PUBLICATIONS

Written Opinion of the International Searching Authority for PCT/EP2009/065790, Jan. 26, 2010.

(Continued)

*Primary Examiner* — Michael Bernshteyn
(74) *Attorney, Agent, or Firm* — Curatolo Sidoti Co., LPA; Joseph G. Curatolo; Salvatore A. Sidoti

(57) ABSTRACT

A process for the preparation of a copolymer in semicontinuous operation in a polymerization apparatus including a polymerization reactor connected to a metering device, acid monomer being initially taken in the metering device and polyether macromonomer and water in the polymerization reactor, acid monomer being metered from the metering device via an acid monomer metering line into the polymerization reactor, a portion of the copolymer-containing aqueous medium being passed continuously during the free radical polymerization from the polymerization reactor via a reaction mixture line which is connected via a mixing device to the acid monomer metering line, the discharged copolymer-containing aqueous medium being mixed with the acid monomer in the mixing device during the metering of the acid monomer and being recycled to the polymerization reactor after the mixing via the acid monomer metering line.

20 Claims, 1 Drawing Sheet

(56) References Cited

U.S. PATENT DOCUMENTS

| | | |
|---|---|---|
| 2003/0199616 A1 | 10/2003 | Yamashita et al. |
| 2006/0183820 A1* | 8/2006 | Asano et al. .................. 524/5 |
| 2007/0161724 A1* | 7/2007 | Moraru et al. .................. 524/59 |
| 2007/0181039 A1 | 8/2007 | Yamamoto et al. |

OTHER PUBLICATIONS

International Search Report for PCT/EP2009/065790, Jan. 26, 2010.

International Preliminary Report on Patentability for PCT/EP2009/065790, Jun. 14, 2011.

* cited by examiner

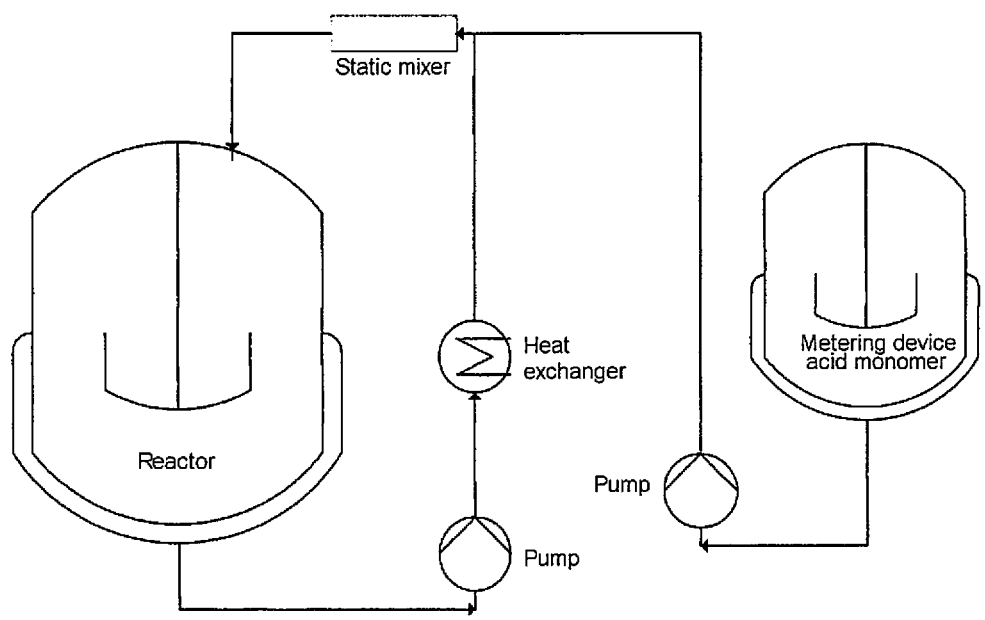

SEMI-CONTINUOUS METHOD FOR PRODUCING COPOLYMERS

CROSS REFERENCE TO RELATED APPLICATIONS

This application is a national stage application of International Application No. PCT/EP2009/065790, filed 25 Nov. 2009, which claims priority from European Patent Application Serial No. 08170979.2, filed 8 Dec. 2008, from which applications priority is claimed, and which are incorporated herein by reference.

The present invention relates to a process for the preparation of a copolymer, the copolymer and the use of the copolymer.

It is known that admixtures in the form of dispersants are often added to aqueous slurries of pulverulent inorganic or organic substances, such as clays, silicate powder, chalk, carbon black, crushed rock and hydraulic binders, for improving their processability, i.e. kneadability, spreadability, sprayability, pumpability or flowability. Such admixtures are capable of breaking up solid agglomerates, of dispersing the particles formed and in this way of improving the processability. This effect is utilized also in a targeted manner in particular in the preparation of building material mixtures which contain hydraulic binders, such as cement, lime, gypsum or anhydrite.

In order to convert these building material mixtures based on said binders into a ready-to-use, processable form, as a rule substantially more mixing water is required than would be necessary for the subsequent hydration or hardening process. The portion of cavities formed in the concrete body as a result of the excess, subsequently evaporating water leads to significantly poorer mechanical strengths and stabilities.

In order to reduce this excess proportion of water at a specified processing consistency and/or to improve the processability at a specified water/binder ratio, admixtures which are generally referred to as water-reducing agents or superplasticizers are used. Agents of this type which are used in practice are in particular copolymers which are prepared by free radical copolymerization of acid monomers with polyether macromonomers.

In practice, the copolymerization is generally effected by the semibatch procedure. WO 2005/075529 describes a semicontinuous process for the preparation of said copolymers, in which the polyether macromonomer is initially taken and the acid monomer is then metered in to the initially taken mixture over time. Although the process described is already economical and high-performance superplasticizers are obtained as a product of the process, there is still an aspiration to improve the cost-efficiency of the process and quality of the product of the process even further.

The object of the present invention is therefore to provide an economical process for the preparation of copolymers which show good performance as dispersants for hydraulic binders, especially as superplasticizers.

This object is achieved by a process for the preparation of a copolymer in semicontinuous operation in a polymerization apparatus, comprising a polymerization reactor connected to a metering device, in each case acid monomer being initially taken in the metering device and polyether macromonomer and water in the polymerization reactor, acid monomer being metered from the metering device via an acid monomer metering line into the polymerization reactor, free radical polymerization initiator being passed into the polymerization reactor before and/or during the metering of the acid monomer into the polymerization reactor so that an aqueous medium in which acid monomer and polyether macromonomer are reacted with formation of the copolymer by free radical polymerization forms in the polymerization reactor, the molar ratio of acid monomer used altogether to polyether macromonomer used altogether being 20:1 to 1:1, the molar ratio of acid monomer initially taken in the polymerization reactor to the acid monomer metered into the polymerization reactor being 3:1 to 1:10, a portion of the copolymer-containing aqueous medium being passed continuously during the free radical polymerization from the polymerization reactor via a reaction mixture line which is connected via a mixing device to the acid monomer metering line, the discharged copolymer-containing aqueous medium being mixed with the acid monomer in the mixing device during the metering of the acid monomer and being recycled after the mixing via the acid monomer metering line into the polymerization reactor.

Acid monomer is to be understood as meaning monomers which are capable of free radical copolymerization, have at least one carbon double bond, contain at least one acid function and react as an acid in an aqueous medium. Furthermore, acid monomer is also to be understood as meaning monomers which are capable of free radical polymerization, have at least one carbon double bond and, owing to a hydrolysis reaction in an aqueous medium, form at least one acid function and react as an acid in the aqueous medium (example: maleic anhydride or base-hydrolysable esters, such as ethyl acrylate). In the context of the present invention, polyether macromonomers are compounds which are capable of free radical copolymerization and have at least one carbon double bond and at least two ether oxygen atoms, in particular with the proviso that the polyether macromonomer structural units present in the copolymer have side chains which contain at least two ether oxygen atoms.

The process according to the invention ensures effective mixing in of the acid monomer. Owing to the thorough mixing, a higher uniformity of the copolymer prepared results, whereby the quality thereof as a dispersant or superplasticizer is improved. Furthermore, there are less undesired hydrolysis reactions at the polyether side chains of the polyether macromonomers. The process according to the invention can be relatively easily implemented and is particularly economical from the process engineering point of view.

In general, the free radical polymerization initiator used is a redox initiator system, the temperature of the copolymer-containing aqueous medium in the polymerization reactor during the free radical polymerization being 5 to 40° C. and the copolymer-containing aqueous medium discharged from the polymerization reactor being cooled by at least 3° C. by means of a cooling device connected to the reaction mixture line.

This cooling step is particularly practical from the processing point of view and also has a positive effect on the quality of the copolymer product.

As a rule, free radical polymerization initiator is passed into the reaction mixture line during the free radical polymerization.

Preferably, the mixing device is downstream of the cooling device.

In general, the mixing device is present as a static mixer.

Frequently, the acid monomer is present in the form of an aqueous solution in the metering device.

In general, the copolymer-containing aqueous medium forms an interface with gas present above in the polymerization reactor, the acid monomer being metered into the polymerization reactor above this interface.

In general, the reaction of the acid monomer produces in the copolymer a structural unit which is according to the general formulae (Ia), (Ib), (Ic) and/or (Id)

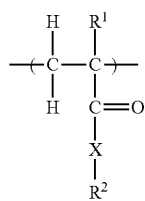
(Ia)

where
$R^1$ is identical or different and is represented by H and/or a straight-chain or branched $C_1$-$C_4$ alkyl group;
X is identical or different and is represented by NH—$(C_nH_{2n})$ where n=1, 2, 3 or 4 and/or O—$(C_nH_{2n})$ where n=1, 2, 3 or 4 and/or by a unit not present;
$R^2$ is identical or different and is represented by OH, $SO_3H$, $PO_3H_2$, O—$PO_3H_2$ and/or para-substituted $C_6H_4$—$SO_3H$, with the proviso that, if X is a unit not present, $R^2$ is represented by OH;

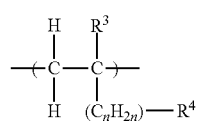
(Ib)

where
$R^3$ is identical or different and is represented by H and/or a straight-chain or branched $C_1$-$C_4$ alkyl group;
n=0, 1, 2, 3 or 4;
$R^4$ is identical or different and is represented by $SO_3H$, $PO_3H_2$, O—$PO_3H_2$ and/or $C_6H_4$—$SO_3H$ present in para-substituted form;

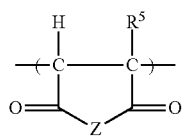
(Ic)

where
$R^5$ is identical or different and is represented by H and/or a straight-chain or branched $C_1$-$C_4$ alkyl group;
Z is identical or different and is represented by O and/or NH;

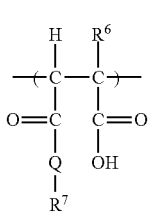
(Id)

where
$R^6$ is identical or different and is represented by H and/or a straight-chain or branched $C_1$-$C_4$ alkyl group;

Q is identical or different and is represented by NH and/or O;
$R^7$ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH_{2m})_e$—O-$(A'O)_\alpha$—$R^9$ where m=0, 1, 2, 3 or 4, e=0, 1, 2, 3 or 4, $A'=C_{x'}H_{2x'}$ where x'=2, 3, 4 or 5 and/or $CH_2C(C_6H_5)H$—, α=an integer from 1 to 350 with $R^9$ identical or different and represented by a straight-chain or branched $C_1$-$C_4$ alkyl group.

Normally, the acid monomer used is methacrylic acid, acrylic acid, maleic acid, maleic anhydride, a monoester of maleic acid and a mixture of a plurality of these components.

Depending on the pH, the acid monomer structural units can also be present in deprotonated form as a salt, in which $Na^+$, $K^+$ and $Ca^{2+}$ are typical as counterions.

In general, a structural unit is produced in the copolymer by the reaction of the polyether macromonomer, which structural unit is according to one of the general formulae (IIa), (IIb) and/or (IIc)

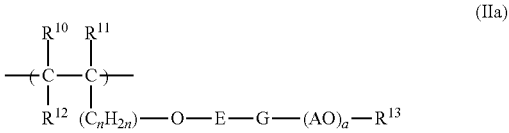
(IIa)

where
$R^{10}$, $R^{11}$ and $R^{12}$ are in each case identical or different and, independently of one another, are represented by H and/or a straight-chain or branched $C_1$-$C_4$ alkyl group;
E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or a unit not present;
G is identical or different and is represented by O, NH and/or CO—NH, with the proviso that, if E is a unit not present, G is also present as a unit not present;
A is identical or different and is represented by $C_xH_{2x}$ where x=2, 3, 4 and/or 5 (preferably x=2) and/or $CH_2CH(C_6H_5)$;
n is identical or different and is represented by 0, 1, 2, 3, 4 and/or 5;
a is identical or different and is represented by an integer from 2 to 350 (preferably 10-200);
$R^{13}$ is identical or different and is represented by H, a straight-chain or branched $C_1$-$C_4$ alkyl group, CO—$NH_2$, and/or $COCH_3$;

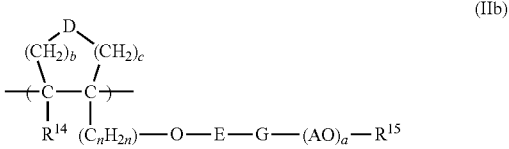
(IIb)

where
$R^{14}$ is identical or different and is represented by H and/or a straight-chain or branched $C_1$-$C_4$ alkyl group;
E is identical or different and is represented by a straight-chain or branched $C_1$-$C_6$ alkylene group, a cyclohexyl group, $CH_2$—$C_6H_{10}$, $C_6H_4$ present in ortho-, meta- or para-substituted form and/or by a unit not present;

G is identical or different and is represented by a unit not present, O, NH and/or CO—NH, with the proviso that, if E is a unit not present, G is also present as a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

a is identical or different and is represented by an integer from 2 to 350;

D is identical or different and is represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O: b=0, 1, 2 or 3, c=0, 1, 2 or 3, where b+c=2 or 3;

$R^{15}$ is identical or different and is represented by H, a straight-chain or branched $C_1$-$C_4$ alkyl group, CO—$NH_2$, and/or $COCH_3$;

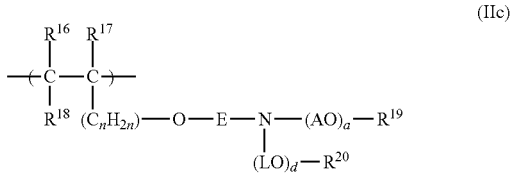

(IIc)

where $R^{16}$, $R^{17}$ and $R^{18}$ in each case are identical or different and, independently of one another, are represented by H and/or a straight-chain or branched $C_1$-$C_4$ alkyl group;

E is identical or different and is represented by a straight-chain or branched $C_1$-$C_6$ alkylene group, a cyclohexyl group, $CH_2$—$C_6H_{10}$ and/or $C_6H_4$ present in ortho-, meta- or para-substituted form;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 and/or $CH_2$—$CH(C_6H_5)$;

a is identical or different and is represented by an integer from 2 to 350;

d is identical or different and is represented by an integer from 1 to 350;

$R^{19}$ is identical or different and is represented by H and/or a straight-chain or branched $C_1$-$C_4$ alkyl group, $R^{20}$ is identical or different and is represented by H and/or a straight-chain $C_1$-$C_4$ alkyl group.

Typically, the polyether macromonomer used is alkoxylated isoprenol and/or alkoxylated hydroxybutyl vinyl ether and/or alkoxylated (meth)allyl alcohol and/or vinylated methylpolyalkylene glycol having preferably in each case an arithmetic mean number of 4 to 340 oxyalkylene groups.

The alkoxy units of the polyether macromonomers are as a rule present as ethoxy groups or as a mixture of ethoxy and propoxy groups (these polyether macromonomers are obtainable from the ethoxylation or propoxylation of the corresponding monomer alcohols).

In general, the free radical polymerization initiator used is a redox initiator system which contains $H_2O_2$, $FeSO_4$ and a reducing agent.

Preferably, the aqueous medium is present in the form of a aqueous solution.

In general, altogether at least 45 mol %, preferably at least 80 mol %, of all structural units of the copolymer are present as acid monomer incorporated in the form of polymerized units and polyether macromonomer incorporated in the form of polymerized units.

Frequently, a chain-transfer agent, which is preferably present in dissolved form, is passed into the polymerization reactor.

The invention additionally relates to a copolymer which can be prepared by the process described above.

The invention furthermore relates to the use of this copolymer as a dispersant for hydraulic binders and/or for latently hydraulic binders. The copolymer can also be used for example (in particular in dewatered from) as an additive for cement production (grinding aid and "water reducer" for pure Portland cements or composite cements).

The invention is to be illustrated in more detail below with reference to a typical embodiment of the invention.

In FIG. 1, the drawing shows a simplified schematic setup of an industrial apparatus in which the process according to the invention can be carried out.

The combination of acid monomer with polyether macromonomer is effected in the reactor. A high degree of mixing is achieved within a relatively short time by introducing the acid monomer solution (acid monomer present in aqueous solution) via metering lances into zones of high turbulence below the liquid level in the reactor. The thorough mixing of acid monomer solution with polyether macromonomer is effected in the circulation line itself with the aid of the static mixer. The following advantages may be listed:

The mixing time up to achieving a degree of mixing close to 1 is considerably shortened.

The reaction mixture is effectively cooled.

The static mixer is easily accessible for dismantling and cleaning.

Regarding distribution of the structural units in the copolymer, a relatively high uniformity results (in spite of different reactivity of polyether macromonomer and acid monomer).

Modifications to the process can be very easily carried out since the mixing-in behaviour of the acid monomer depends virtually exclusively on the character of the static mixer and scarcely on the geometry of the reactor or the mixing effect of the stirrer.

The proportion of resulting, undesired hydrolysis by-product of the polyether macromonomer is relatively small.

What is claimed is:

1. A process for preparing a copolymer in a semicontinuous mode of operation in a polymerization apparatus containing a polymerization reactor connected to a metering device, the process comprising:

(a) initially introducing an acid monomer into the metering device and initially introducing polyether macromonomer and water into the polymerization reactor, (b) metering the acid monomer from the metering device via an acid monomer metering line into the polymerization reactor, (c) passing free radical polymerization initiator into the polymerization reactor before and/or during the metering of the acid monomer into the polymerization reactor, thereby forming an aqueous medium in the polymerization reactor, and reacting the acid monomer and the polyether macromonomer in the aqueous medium by free radical polymerization and forming the copolymer, wherein the molar ratio of all the acid monomer used to all the polyether macromonomer used is 20:1 to 1:1, the molar ratio of the acid monomer initially metered into the polymerization reactor to the acid monomer metered into the polymerization reactor after initially passing the initiator being 3:1 to 1:10, and passing a discharged portion of the copolymer-containing aqueous medium continuously during the free radical polymerization from the polymerization reactor to the acid monomer metering line via a reaction mixture line which is connected via a mixing device to the acid monomer metering line, the discharged copolymer-containing aqueous medium being mixed with the acid monomer in the mixing device during the metering of the acid monomer and being recycled to the polymerization reactor after the mixing via the acid monomer metering line.

2. The process according to claim 1, wherein the free radical polymerization initiator used is a redox initiator system and the temperature of the copolymer-containing aqueous medium in the polymerization reactor during the free radical polymerization is 5 to 40° C., and comprising cooling the discharged copolymer-containing aqueous medium by at least 3° C. by a cooling device connected to the reaction mixture line.

3. The process according to claim 1 comprising passing the free radical polymerization initiator into the reaction mixture line during the free radical polymerization.

4. The process according to claim 2 wherein the mixing device is downstream of the cooling device.

5. The process according to claim 1, wherein the mixing device comprises a static mixer.

6. The process according to claim 1, wherein the acid monomer comprises an aqueous solution in the metering device.

7. The process according to claim 1, wherein the copolymer-containing aqueous medium forms an interface with gas present above in the polymerization reactor, the acid monomer being metered into the polymerization reactor above this interface.

8. The process according to claim 1, wherein a structural unit is produced in the copolymer by the reaction of the acid monomer, which structural unit is according to one of the general formulae (Ia), (Ib), (Ic) and/or (Id)

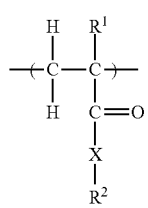
(Ia)

where
$R^1$ is identical or different and is represented by H and/or a straight-chain $C_1$-$C_4$ alkyl group or a branched $C_3$-$C_4$ alkyl group;
X is identical or different and is represented by NH—$(C_nH_{2n})$ where n=1, 2, 3 or 4 and/or O—$(C_nH_{2n})$ where n=1, 2, 3 or 4 and/or by a unit not present;
$R^2$ is identical or different and is represented by OH, $SO_3H$, $PO_3H_2$, O—$PO_3H_2$ and/or para-substituted $C_6H_4$—$SO_3H$, with the proviso that, if X is a unit not present $R^2$ is represented by OH;

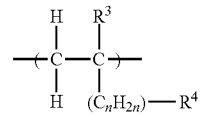
(Ib)

where
$R^3$ is identical or different and is represented by H and/or a straight-chain $C_1$-$C_4$ alkyl group or a branched $C_1$-$C_4$ alkyl group;
n=0, 1, 2, 3 or 4;
$R^4$ is identical or different and is represented by $SO_3H$, $PO_3H_2$, O—$PO_3H_2$ and/or $C_6H_4$—$SO_3H$ present in par-substituted form;

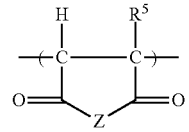
(Ic)

where
$R^5$ is identical or different and is represented by H and/or a straight-chain $C_1$-$C_4$ alkyl group or a branched $C_3$-$C_4$ alkyl group;
Z is identical or different and is represented by O and/or NH;

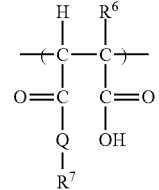
(Id)

where
$R^6$ is identical or different and is represented by H and/or a straight-chain $C_1$-$C_4$ alkyl group or a branched $C_3$-$C_4$ alkyl group;
Q is identical or different and is represented by NH and/or O;
$R^7$ is identical or different and is represented by H, $(C_nH_{2n})$—$SO_3H$ where n=0, 1, 2, 3 or 4, $(C_nH_{2n})$—OH where n=0, 1, 2, 3 or 4; $(C_nH_{2n})$—$PO_3H_2$ where n=0, 1, 2, 3 or 4, $(C_nH_{2n})$—$OPO_3H_2$ where n=0, 1, 2, 3 or 4, $(C_6H_4)$—$SO_3H$, $(C_6H_4)$—$PO_3H_2$, $(C_6H_4)$—$OPO_3H_2$ and/or $(C_mH2_m)_e$—O-(A'O)$_\alpha$—$R^9$ where m=0, 1, 2, 3 or 4, e=0, 1, 2, 3 or 4, A'=$C_xH_{2x'}$ where x'=2, 3, 4 or 5 and/or $CH_2C(C_6H_5)H$—, $\alpha$=an integer from 1 to 350 with $R^9$ identical or different and represented by a straight-chain $C_1$-$C_4$ alkyl group or a branched $C_3$-$C_4$ alkyl group.

9. The process according to claim 1, wherein the acid monomer is methacrylic acid, acrylic acid, maleic acid, maleic anhydride, a monoester of maleic acid or a mixture of a plurality of said monomers.

10. The process according to claim 1, wherein a structural unit is produced in the copolymer by the reaction of the polyether macromonomer, which structural unit is according to one of the general formulae (IIa), (IIb) and/or (IIc)

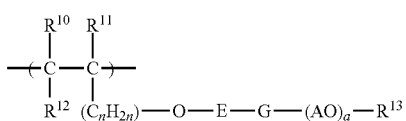

(IIa)

where
$R^{10}$, $R^{11}$ and $R^{12}$ are in each case identical or different and, independently of one another, are represented by H and/or a straight-chain $C_1$-$C_4$ alkyl group or a branched $C_3$-$C_4$ alkyl group:

E is identical or different and is represented by a straight-chain $C_1$-$C_6$ alkylene group or branched $C_3$-$C_6$ alkylene group, a cyclohexyl group, $CH_2$—$C_6H_{10}$, $C_6H_4$ present in ortho-substituted, meta-substituted or para-substituted form and/or a unit not present;

G is identical or different and is represented by O, NH and/or CO—NH, with the proviso that, if E is a unit not present, G is also a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

a is identical or different and is represented by an integer from 2 to 350;

$R^{13}$ is identical or different and is represented by H, a straight-chain $C_1$-$C_4$ alkyl group or a branched $C_3$-$C_4$ alkyl group, CO—$NH_2$, and/or $COCH_3$;

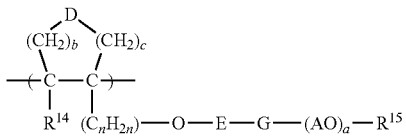

(IIb)

where
$R^{14}$ is identical or different and is represented by H and/or a straight-chain $C_1$-$C_4$ alkyl group or a branched $C_3$-$C_4$ alkyl group;

E is identical or different and is represented by a straight-chain $C_1$-$C_6$ alkylene group or branched $C_3$-$C_6$ alkylene group, a cyclohexyl group, $CH_2$—$C_6H_4$, $C_6H_4$ present in ortho-substituted, meta-substituted or para-substituted form and/or by a unit not present;

G is identical or different and is represented by a unit not present, O, NH and/or CO—NH, with the proviso that, if E is a unit not present, G is also a unit not present;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

a is identical or different and is represented by an integer from 2 to 350;

D is identical or different and is represented by a unit not present, NH and/or O, with the proviso that if D is a unit not present: b=0, 1, 2, 3 or 4 and c=0, 1, 2, 3 or 4, where b+c=3 or 4, and with the proviso that if D is NH and/or O; b=0, 1, 2 or 3, c=0, 1, 2 or 3, where b+c=2 or 3;

$R^{15}$ is identical or different and is represented by H, a straight-chain $C_1$-$C_4$ alkyl group or a branched $C_3$-$C_4$ alkyl group, CO—$NH_2$, and/or $COCH_3$;

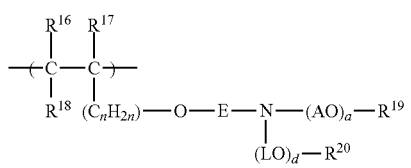

(IIc)

where
$R^{16}$, $R^{17}$ and $R^{18}$ in each case are identical or different and, independently of one another, are represented by H and/or a straight-chain $C_1$-$C_4$ alkyl group or a branched $C_3$-$C_4$ alkyl group;

E is identical or different and is represented by a straight-chain $C_1$-$C_6$ alkylene group or branched $C_3$-$C_6$ alkylene group, a cyclohexyl group, $CH_2$—$C_6H_4$ and/or $C_6H_4$ present in ortho-substituted, meta-substituted or para-substituted form;

A is identical or different and is represented by $C_xH_{2x}$ where x=2, 3, 4 and/or 5 and/or $CH_2CH(C_6H_5)$;

n is identical or different and is represented by 0, 1, 2, 3, 4 and/or 5;

L is identical or different and is represented by $C_xH_{2x}$ where x=2, 3, 4 and/or 5 and/or $CH_2$—$CH(C_6H_5)$;

a is identical or different and is represented by an integer from 2 to 350;

d is identical or different and is represented by an integer from 1 to 350;

$R^{19}$ is identical or different and is represented by H and/or a straight-chain $C_1$-$C_4$ alkyl group or a branched $C_3$-$C_1$ alkyl group;

$R^{20}$ is identical or different and is represented by H and/or a straight-chain $C_1$-$C_4$ alkyl group.

11. The process according to claim 1, wherein the polyether macromonomer is alkoxylated isoprenol, alkoxylated hydroxybutyl vinyl ether, alkoxylated (meth)allyl alcohol, vinylated methylpolyalkylene glycol or mixtures thereof.

12. The process according to claim 1, wherein the free radical polymerization initiator used is a redox initiator system comprising $H_2O_2$, $FeSO_4$ and a reducing agent.

13. The process according to claim 1, wherein the aqueous medium comprising an aqueous solution.

14. The process according to claim 1, wherein at least 45 mol % of all structural units of the copolymer are present as acid monomer incorporated in the form of polymerized units and polyether macromonomer incorporated in the form of polymerized units.

15. The process according to claim 1, comprising passing a chain-transfer agent into the polymerization reactor.

16. A copolymer prepared by the process according to claim 1.

17. The process of use of a copolymer according to claim 16 as a dispersant comprising adding the copolymer as a dispersant to an aqueous slurry of hydraulic binder or of latent hydraulic binder.

18. The process according to claim 1, wherein the polyether macromonomer is alkoxylated isoprenol, alkoxylated hydroxybutyl vinyl ether, alkoxylated (meth)allyl alcohol, vinylated methylpolyalkylene glycol or mixtures thereof having optionally in each case an arithmetic mean number of 4 to 340 oxyalkylene groups.

19. The process is according to claim 1, wherein at least 80 mol % of all structural units of the copolymer are present as acid monomer incorporated in the form of polymerized units and polyether macromonomer incorporated in the form of polymerized units.

20. The process according to claim 15, wherein the chain-transfer agent is present in dissolved form.

* * * * *

UNITED STATES PATENT AND TRADEMARK OFFICE
CERTIFICATE OF CORRECTION

PATENT NO. : 8,536,285 B2
APPLICATION NO. : 13/133026
DATED : September 17, 2013
INVENTOR(S) : Dorfner et al.

It is certified that error appears in the above-identified patent and that said Letters Patent is hereby corrected as shown below:

In the Claims

Claim 8, column 8, lines 11-12; the description of Radical $R^3$ should read "...a branched $C_3$-$C_4$ alkyl group;...."

Claim 8, column 8, lines 15-16; the description of Radical $R^4$ should read "...present in para-substituted form;...."

Claim 9, column 8, line 63; the description of the monomers should read "...or a mixture of a plurality of said acid monomers."

Claim 10, column 9, line 46; the description of E in formula (IIb) should read "a cyclohexyl group, $CH_2$-$C_6H_{10}$, $C_6H_4$ present...."

Claim 10, column 10, line 16; the description of E in formula (IIc) should read "a cyclohexyl group, $CH_2$-$C_6H_{10}$ and/or $C_6H_4$...."

Claim 10, column 10, lines 28-29; the description of Radical $R^{19}$ should read "a branched $C_3$-$C_4$ alkyl group;...."

Signed and Sealed this
Eighteenth Day of February, 2014

Michelle K. Lee
*Deputy Director of the United States Patent and Trademark Office*